(12) United States Patent
Eilenberger

(10) Patent No.: US 11,469,639 B2
(45) Date of Patent: Oct. 11, 2022

(54) STATOR HAVING AN INSULATION LAYER

(71) Applicant: Miba eMobility GmbH, Laakirchen (AT)

(72) Inventor: Andreas Eilenberger, Lengenfeld (AT)

(73) Assignee: Miba eMobility GmbH, Laakirchen (AT)

(*) Notice: Subject to any disclaimer, the term of this patent is extended or adjusted under 35 U.S.C. 154(b) by 94 days.

(21) Appl. No.: 17/054,258

(22) PCT Filed: May 28, 2019

(86) PCT No.: PCT/AT2019/060177
§ 371 (c)(1),
(2) Date: Nov. 10, 2020

(87) PCT Pub. No.: WO2019/227115
PCT Pub. Date: Dec. 5, 2019

(65) Prior Publication Data
US 2021/0184529 A1    Jun. 17, 2021

(30) Foreign Application Priority Data
May 29, 2018 (AT) .................. A 50436/2018

(51) Int. Cl.
*H02K 3/34* (2006.01)
*H02K 3/24* (2006.01)
(Continued)

(52) U.S. Cl.
CPC ........... *H02K 3/345* (2013.01); *H01B 7/0275* (2013.01); *H02K 3/04* (2013.01); *H02K 3/24* (2013.01); *H02K 3/30* (2013.01); *H02K 3/32* (2013.01)

(58) Field of Classification Search
CPC .......... H01B 7/0275; H02K 3/04; H02K 3/24; H02K 3/30; H02K 3/32; H02K 3/345
(Continued)

(56) References Cited

U.S. PATENT DOCUMENTS 9,831,734 B2    11/2017 Sakaue et al.
10,210,966 B2    2/2019 Yamoto et al.
(Continued)

FOREIGN PATENT DOCUMENTS

DE    11 2013 004 722 T5    6/2015
DE    10 2015 216 840 A1    3/2017
(Continued)

OTHER PUBLICATIONS

International Search Report in PCT/AT2019/060178, dated Sep. 18, 2019.
(Continued)

*Primary Examiner* — Rashad H Johnson
(74) *Attorney, Agent, or Firm* — Collard & Roe, P.C.

(57) ABSTRACT

A stator for an electric machine includes a laminated core having grooves evenly distributed in the circumferential direction around a longitudinal axis and continuously extending in a longitudinal direction of the core. Each groove receives at least two electric conductors having a substantially rectangular cross-section that are insulated against each other and against the core by at least one insulation layer coating in the radial direction and the circumferential direction as well as in the longitudinal direction at least over a stator height of the stator. The at least one insulation layer includes a thermoplastic high-performance polymer continuously closed in the circumferential direction and the radial direction and preferably directly extruded on the electric conductor. The insulation layer, at least in the circumferential direction, has a total (Continued)

Figure 1:
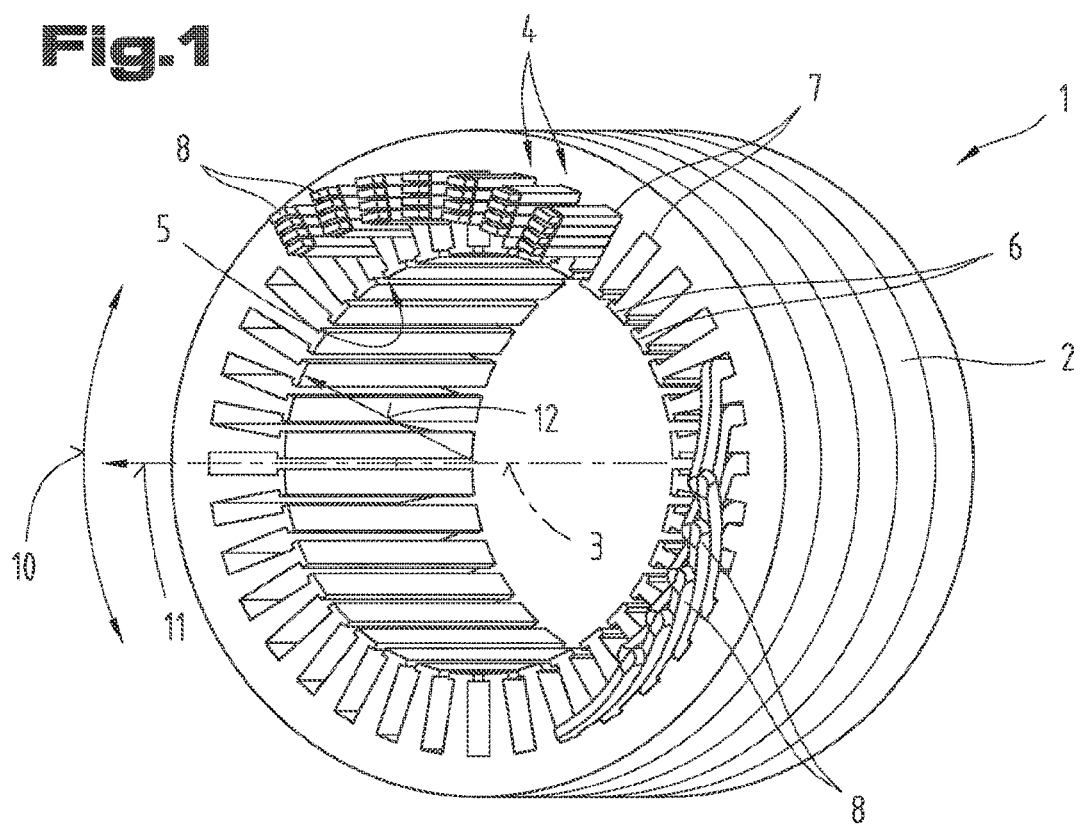

circumferential layer thickness at least 1.5 to 3, preferably 1.8 to 2.2 times a total radial layer thickness of the respective electric conductor.

14 Claims, 5 Drawing Sheets

(51) Int. Cl.
    *H02K 3/30*     (2006.01)
    *H01B 7/02*     (2006.01)
    *H02K 3/04*     (2006.01)
    *H02K 3/32*     (2006.01)

(58) Field of Classification Search
    USPC .......................... 310/65, 179, 180, 181, 208
    See application file for complete search history.

(56) References Cited

U.S. PATENT DOCUMENTS

| | | | |
|---|---|---|---|
| 10,250,095 B2 | 4/2019 | Akashi et al. | |
| 10,319,491 B2 | 6/2019 | Fukuda et al. | |
| 2004/0124733 A1* | 7/2004 | Yamamoto | H02K 15/12 |
| | | | 29/596 |
| 2005/0146232 A1* | 7/2005 | Yamamoto | H02K 15/12 |
| | | | 310/43 |
| 2013/0285483 A1* | 10/2013 | Lee | H02K 21/24 |
| | | | 310/156.32 |
| 2015/0084448 A1* | 3/2015 | Nonaka | H02K 1/16 |
| | | | 310/43 |
| 2015/0243410 A1 | 8/2015 | Knerr et al. | |
| 2016/0156241 A1 | 6/2016 | Gruebel et al. | |
| 2017/0004900 A1 | 1/2017 | Ishii et al. | |
| 2019/0131037 A1 | 5/2019 | Hochstoeger et al. | |

FOREIGN PATENT DOCUMENTS

| | | |
|---|---|---|
| EP | 3 043 355 A1 | 7/2016 |
| EP | 3 118 858 A1 | 1/2017 |
| EP | 3 226 258 A1 | 10/2017 |
| EP | 3 239 989 A1 | 11/2017 |
| EP | 3 267 563 A1 | 1/2018 |
| JP | 2017-163666 A | 9/2017 |
| WO | 2014/056547 A1 | 4/2014 |

OTHER PUBLICATIONS

International Search Report in PCT/AT2019/060177, dated Sep. 10, 2019.

* cited by examiner

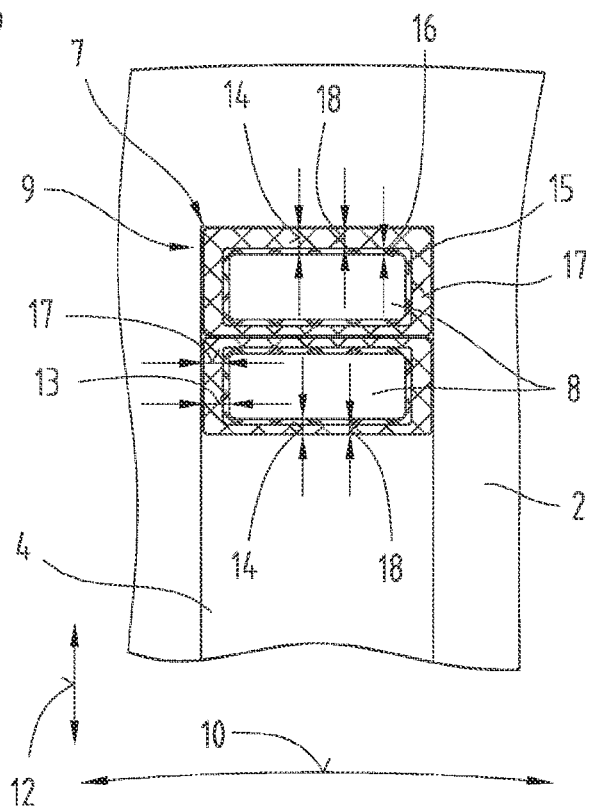
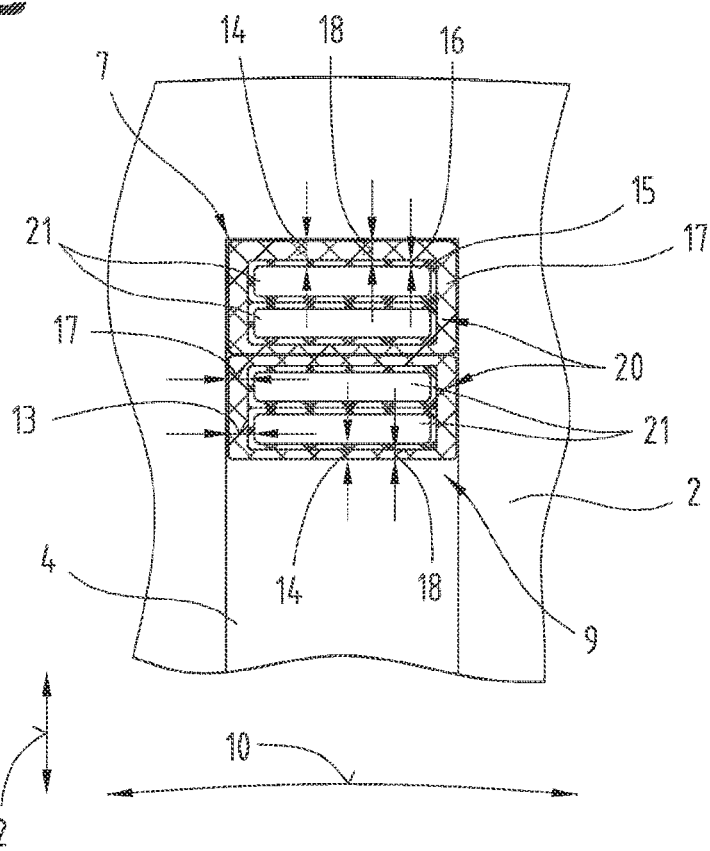

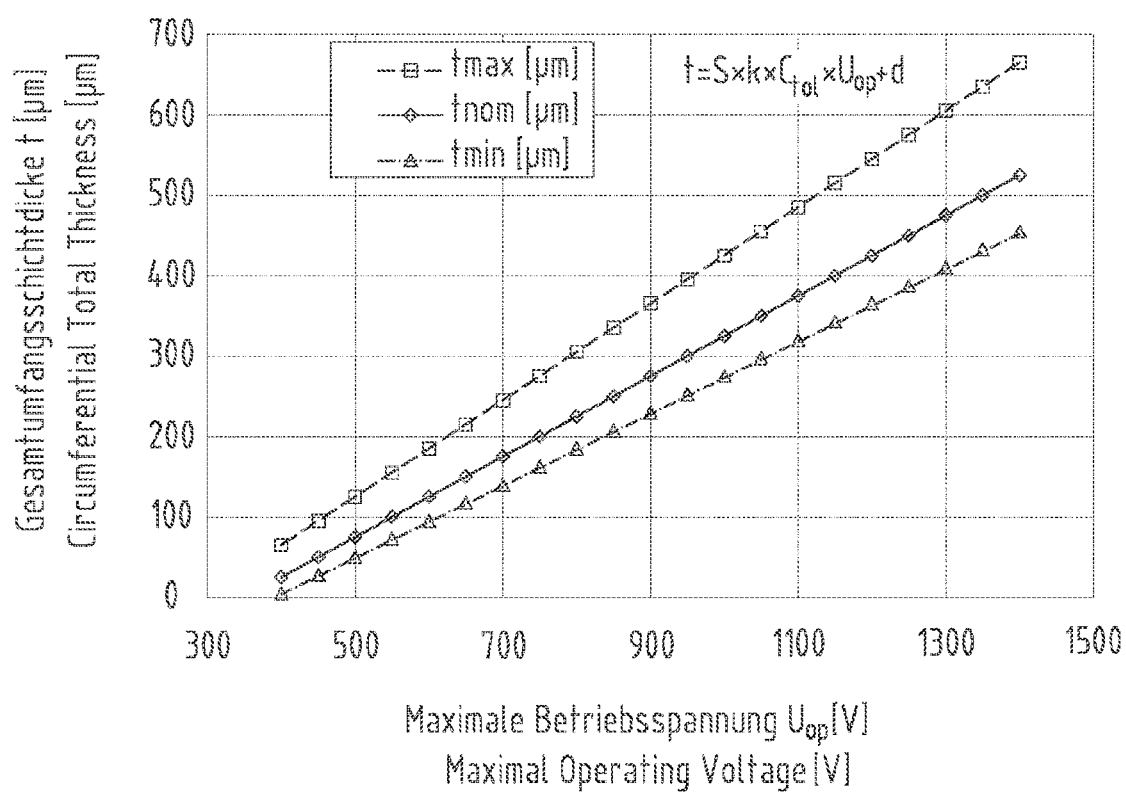

STATOR HAVING AN INSULATION LAYER

CROSS REFERENCE TO RELATED APPLICATIONS

This application is the National Stage of PCT/AT2019/060177 filed on May 28, 2019, which claims priority under 35 U.S.C. § 119 of Austrian Application No. A50436/2018 filed on May 29, 2018, the disclosure of which is incorporated by reference. The international application under PCT article 21(2) was not published in English.

The invention relates to stator for an electric machine, wherein the electric conductors are coated with an insulation layer in the circumferential and radial directions such that a particularly high packing density of the electric conductors is enabled.

In principle, such electric machines and the stators used therefor are known in the art; therefore, reference is made to such relevant prior art for further details. An electric machine may preferably also comprise a rotor, which may, for example, be arranged on a rotatable shaft in a rotationally secure manner During the operation of an electric machine, which may, for example, be configured as an electric motor, the rotor is put into a rotational movement due to the magnetic fields created. However, in principle, the stator may also be used without a rotor for creating a rotating field.

Stators for electrical electric motors comprise electric coils which are configured around an electrically and magnetically conductive core in the form of windings and create a magnetic field in the stator pack when current flows through the coils, which magnetic field is required for driving the electric motor. Said windings may, for example, be created by inserting U-shaped conductor elements or rod-shaped conductor elements into the stator pack and inter-connecting the provided conductor elements into windings.

The electric voltage, which is partly quite high and applied to the individual electric conductors during operation, may result in an electric contact being formed between the conductors and/or towards the laminated core. To avoid this, the electric conductors have to be insulated against each other and towards the laminated core, as the person skilled in the art knows. The relevant standards, such as EN 60664-1, prescribe forming a double insulation layer in this regard, or at least one absolutely flawless insulation layer.

Insulating the electric conductors by means of a varnish layer deposited on the electric conductor and resin-impregnated insulation paper used to be a very common method of meeting the insulation requirements. Applying the varnish layer with a thickness of several 10 μm to several 100 μm onto the electric conductor requires hardening, which is often carried out in a furnace and is very time-consuming and expensive. Likewise, introducing the groove paper and subsequently inserting the electric conductors require considerable technical effort.

An alternative is disclosed in DE102015216840A1. There, a stator for an electric machine having electric conductors is described, which are insulated against the laminated core by means of an insulation element. In this regard, the insulation element is formed from a thermoplastic tubular element, which surrounds or coats the respective electric conductor. Thus, instead of using groove paper, each electric conductor has to be assembled with a dedicated tubular element before it is inserted into the stator, which requires significant processing efforts.

Another possibility for achieving sufficient insulation is disclosed in EP3043355A1. Here, electric conductors having a multi-layer insulation layer are described, which comprise a thermosetting varnish containing urethane as a bonding layer to a thermoplastic resin deposited thereon. However, prior to further processing, the varnish layer must be hardened in a furnace before the second layer or top layer can be applied, which involves increased processing efforts.

US2015243410A1 describes the problem that an insulation layer on electric conductors of multiple thermosetting varnish layers may, as the number of varnish layers increases, lead to lowered adhesive force between the individual varnish layers and, in addition, blisters may often occur. It is proposed there to build an insulation layer from multiple layers, with the outermost layer consisting of a thermoplastic resin and being bonded to the electric conductor by means of a thermosetting varnish layer. However, in this regard, the base varnish layer must be hardened as well, which involves considerable processing efforts.

In the manufacture of compact and nevertheless powerful stators of electric machines, the power or effectiveness may additionally strongly depend on the insulation materials used and the number of windings or the packing density of the electric conductors.

It has been the object of the present invention to overcome the disadvantages of the prior art and to provide a stator that combines sufficient insulation between the electric conductors and towards the laminated core with a particularly high space factor of electric conductors in the dedicated grooves of the laminated core.

This object is achieved by a device and a method according to the claims.

In this regard, the stator for an electric machine according to the invention comprises a laminated core having multiple grooves evenly distributed in a circumferential direction and around a longitudinal axis and continuously extending in a longitudinal direction of the laminated core, which grooves are each provided for receiving at least two electric conductors having a substantially rectangular cross-section. In this regard, the electric conductors are insulated against each other and against the laminated core by means of at least one insulation layer coating in the radial direction and the circumferential direction as well as in the longitudinal direction at least over a stator height of the stator. In this regard, to ensure flawless insulation, the at least one insulation layer comprises a thermoplastic high-performance polymer, which is continuously closed in the circumferential direction and the radial direction and preferably directly molded on the electric conductor by means of an extrusion process. The insulation layer, at least in the circumferential direction, has a total circumferential layer thickness, which is at least 1.5 to 3, preferably 1.8 to 2.2 times a total radial layer thickness in the radial direction of the respective electric conductor.

An insulation layer made of a thermoplastic high-performance polymer and configured in such a continuous manner can meet the insulation requirements already as a single layer. Direct molding onto the electric conductor may be carried out by means of direct application, for example a rolling process, a casting process or preferably by means of an extrusion process. This way, both [sic] sufficient adherence on the electric conductor, which usually consists of copper, may be realized. In this regard, extruded high-performance polymers often have characteristic surface structures, which are naturally visible as a kind of "extrusion marks" in the extrusion direction, and they are thus clearly distinguishable from a conventionally-applied varnish layer.

Electric conductors coated in such a way may be introduced into the laminated core relatively quickly, comfortably and safely since no additional insulation element or groove paper needs to be provided between the conductors and the laminated core. It has been surprisingly shown that the insulation between the electric conductors, i.e. in the radial direction, may be comparatively slim if the total circumferential layer thickness exceeds the total radial layer thickness at the specified ratio. By means of the different distribution of layer thicknesses in the circumferential direction and the radial direction of each electric conductor, the packing density of the conductors in the groove may thus be increased relatively simply. It has been shown that this design criterion, which is also referred to as "copper space factor", allows increasing the effectiveness of a stator without compromising the insulating properties. Moreover, protection against damage during insertion of the electric conductors into the laminated core or during any subsequent bending processes for forming the windings or coils may be positively influenced by the increased circumferential layer thickness.

The total circumferential layer thickness and the total radial layer thickness depending thereon may be defined by the person skilled in the art beforehand in consideration of the maximum operating voltage $U_{op}$ to be applied.

It has been shown that a predeterminable maximum operating voltage $U_{op}$ of the stator may be used for calculating an admissible lower limit for the total circumferential layer thickness. This way, different stator sizes, all with high effectiveness and a high copper space factor, may be realized relatively simply with the same concept.

It may further be appropriate if the at least one insulation layer has a total circumferential layer thickness t, which may be calculated with the following formula:

$$t = S \cdot k \cdot C_{tol} \cdot U_{op} + d$$

The total circumferential layer thickness thus depends on a predeterminable maximum operating voltage $U_{op}$ and may be calculated with the mathematical result of the sum of a correction factor d of the quantity −175 μm and the product of a safety factor S of the quantity 2.00 with a preexponential factor k of the quantity 0.25 μm/V with a tolerance factor $C_{tol}$ in the range of 0.90 to 1.20 and the predeterminable maximum operating voltage $U_{op}$ in the range of 400 V to 1400 V.

Usually, the tolerance factor $C_{tol}$ has the quantity 1; however, due to material-related tolerances, it may assume a tolerance factor $C_{tol}$ of 0.9 to 1.2. This way, it may be ensured that the total circumferential layer thickness in the circumferential direction has sufficient insulation against the laminated core, and the total radial layer thickness has sufficient insulation between the electric conductors.

It may further be provided that at least two, preferably four or more, electric conductors are connected by means of an additional support layer coating the at least two electric conductors together in the radial direction and the circumferential direction.

This measure allows connecting multiple electric conductors in a simple, non-conductive manner. This way, insertion into the respectively provided grooves of the stator is significantly simplified and may preferably be carried out in an automated manner. Furthermore, any damage, such as scratches, to the insulation layer during insertion of the conductor pack thus created may be avoided. The at least two, preferably four or more electric conductors are coated together by the joint support layer and preferably have the local total circumferential layer thicknesses and the radial circumferential layer thicknesses before the support layer is applied. The ratio of the total circumferential layer thickness to the radial circumferential layer thickness of a respective conductor may, however, also be achieved by means of the support layer. This way, the advantage may arise that the individual electric conductors may have relatively thin or slim insulation layers in the radial direction relative to one another or in the circumferential direction, which may prevent damage during a subsequent bending operation of the conductor ends outside the stator. The support layer is primarily provided only for serving as a joint coating around the electric conductors within the conductor pack, and it is therefore substantially limited to the height of the stator or the grooves in the longitudinal direction.

In addition, it may be provided that the total radial layer thickness of the electric conductors adjacently arranged in the radial direction at a groove base and/or at an air gap and/or the tooth tip of the respective groove, in the radial direction on the side facing the groove base or the tooth tip and/or the air gap, is at least 1.5 to 3, preferably 1.8 to 2.2 times the total radial layer thickness of an electric conductor adjacently arranged thereto in the radial direction, preferably 200 to 500 μm.

This embodiment allows the electric conductors adjacently arranged in the radial direction to have a relatively slim insulation layer to one another, and only the electric conductors arranged at the "innermost" and/or the "outermost" positions in the radial direction have a kind of additional insulation by the increased total radial layer thickness of the respective electric conductors. This may be advantageous especially if more than four electric conductors are present, for example six or eight, as the copper space factor in the groove may be increased, and the insulation layer is configured with additional thickness only in the areas in the radial direction towards the tooth tip and/or the air gap and/or the groove base of the respective groove. In addition, this measure may serve for bracing the electric conductors against the conductor pack by means of the increased total radial layer thickness in the radial direction of the outer and/or inner electric conductors. This promotes operational safety and may prevent vibrations or problems regarding the fatigue strength of the insulation layer during use.

Furthermore, an embodiment is advantageous where it may be provided that the insulation layer comprises a first base layer directly molded on the electric conductor and having a base layer thickness, and a second top layer directly molded on the first base layer, preferably by means of an extrusion process, and having a top layer thickness.

The relative top or base layer thicknesses may, depending on the specific application, be optimized by the person skilled in the art within the aforementioned ratios of the total radial layer thickness and/or the total circumferential layer thickness. In addition, this concept may also be correspondingly applied to three or more insulation layers. The advantage of an at least double insulation layer which has been directly molded on the electric conductor is mainly that any manufacturing-related voids in the base layer may be closed or "healed" by the second top layer. In this regard, molding a high-performance polymer by means of an extrusion process has proven to be particularly advantageous as the occurrence of voids in the high-performance polymer at the same location in the circumferential or radial direction along the electric conductor is highly improbable. This reduces production costs and increases operational safety, and the costs for elaborate inspections for flaws may be additionally significantly reduced compared to a single insulation layer.

An additional advantage of the at least double insulation layer compared to a single insulation layer may be improved crack resistance.

According to a further development, it is possible that the top layer thickness, at least in the circumferential direction, is at least 1.5 to 3, preferably 1.8 to 2.2 times the underlying base layer thickness, which base layer thickness preferably lies in the range of 10 to 200 µm.

This way, during manufacture of the insulation layer, a substantially uniform and thin base layer may be directly molded on all electric conductors, and the locally required total radial and/or total circumferential layer thicknesses may only be adjusted when the top layer is applied. This offers some advantages with respect to the process and allows fast and cost-effective application of the insulation layer, among other things. It has been shown that a very thin base layer of, for example, a few 10 µm to approximately 200 µm is sufficient, depending on the specific application, and any defects or voids in the base layer may be efficiently healed by means of the top layer, and the local insulating properties may simultaneously be achieved.

Moreover, it may be appropriate if, for forming at least one parallel conductor, at least one electric conductor comprises two sub-conductors provided for being subject to the same electric potential difference, wherein the two corresponding sub-conductors are each coated with the base layer and jointly coated with the top layer.

Configuring an electric conductor as two parallel sub-conductors may be referred to as "pin parallelization" and cause a reduction of current displacement effects. In this regard, the sub-conductors are each preferably separated from one another by a very thin insulation layer, which is sufficiently formed by the base layer in the present case. By adjusting the total radial layer thickness and/or the total circumferential layer thickness by means of the top layer, the aforementioned insulation layer may be configured such that the copper space factor in the stator may be significantly increased compared to a single insulation layer. In this regard, it is particularly advantageous for the manufacturing process if the base layer is configured in a substantially homogeneously coating manner in the circumferential and radial directions of the respective sub-conductor as the arrangement and coating by the top layer may be relatively simply adjusted at the respective parallel conductor. Such an arrangement of the sub- and parallel conductors additionally simplifies handling and may provide additional support of the electric conductors within the groove of the stator.

Moreover, it may be provided that the base layer thickness in the radial direction between the corresponding sub-conductors is 10 to approximately 100 µm, preferably 10 to approximately 50 µm.

This way, a very compact arrangement of the sub-conductors may be achieved forming the parallel conductors.

It may further be advantageous if the base layer thickness in the radial direction, on the respective side facing away from the corresponding sub-conductor, in the radial and/or circumferential direction, has a base layer thickness of at least 5 to 15, preferably 10 to 12.5, particularly preferably of 100 to 300 µm, times the base layer thickness between the corresponding sub-conductors.

This measure allows very efficient insulation of the sub-conductors, which are subject to the same electric potential difference during operation of the stator, while they have a very small distance between one another. By means of the indicated ratio, sufficient insulation against adjacently arranged sub-conductors or parallel conductors is formed, and a very high copper space factor may nevertheless be achieved, which may increase the effectiveness of the stator.

It may further be provided that the at least one insulation layer and/or the top layer and/or the support layer comprises, in the radial direction and at least on one side, at least one, preferably U- or I-shaped extension for forming at least one cooling channel extending in the longitudinal direction of the stator.

Such an extension or multiple extensions may space the electric conductors from the groove base and/or the tooth tip and/or the air gap in a relatively simple manner Such extensions may preferably be formed simultaneously during molding of the insulation layer on the electric conductor, for example by means of extrusion of the high-performance polymer. In this regard, on the one hand, the extensions have a support function for the laminated core. On the other hand, the remaining cavities between the adjacently arranged electric conductors and the laminated core may be used as a cooling channel, which is formed in the longitudinal direction along the laminated core. Likewise, said cavities may be used for introducing dip or impregnating resin in order to optimize material usage. This way, introducing additional elements known in the art for forming cooling channels may be dispensed with, and the production costs and the efforts for assembling the stator may thus be reduced.

According to a special embodiment, it is possible that between the air gap and/or the tooth tip of the respective groove and/or at the groove base and the at least one insulation layer or the top layer or the support layer of the electric conductor and/or parallel conductor adjacently arranged in the radial direction, an additional, electrically insulating barrier layer is arranged, preferably selected from the group of polyimide (PI), polyamideimide (PAI), polyaryletherketone (PAEK), polyphenylene sulfone (PPSU), polyetheretherketone (PEEK).

This measure may be used for ensuring the required insulating properties in the radial direction against the laminated core in a relatively simple manner. In this regard, it is advantageous that no electric conductors having different total radial layer thicknesses and intended for respective positions in the groove have to be provided. This has manufacturing advantages as all electric conductors may be manufactured in the same way. Therefore, it may be sufficient if all conductors have a predetermined total circumferential layer thickness, which exceeds the total circumferential layer thickness of the electric conductor at the aforementioned ratio. In addition, it may be provided that the barrier layer may be glued, cast, sprayed and thus also directly molded on the "innermost" and/or "outermost" electric conductors. For manufacturing such barrier layers, polymers with sufficient temperature stability and electrical insulating properties have proven to be particularly advantageous. Moreover, these polymers have the advantage of good processability, such as extrudability and/or weldability, and may also be high-performance polymers.

In a special embodiment, the barrier layer and the aforementioned extensions may be configured as one combined element. On the one hand, very simple manufacture of the extensions as a part of the barrier layer may be realized this way, and, on the other hand, it is possible to exploit the advantage that all electric conductors may be configured with a substantially similar insulation layer.

According to an advantageous further development, it may be provided that the at least one insulation layer has an adherence to the electric conductor of more than 35 g/mm, preferably more than 45 g/mm according to DIN EN ISO 527-1:2012-06 or VDI 2019:2016-04.

Making a peel test according to DIN EN ISO 527-1:2012-06 or VDI 2019:2016-04 is known to the person skilled in the art and usually used as a criterion for assessing the adherence of the at least one insulation layer to the electric conductor. It has been shown that adherence of the insulation layer of more than 35 g/mm and above in combination with the relatively thin total radial layer thicknesses and/or the total circumferential layer thicknesses allows good formability of the electric conductors although the electric conductors are arranged very closely to one another. It is therefore advantageous if, with a desirably high copper space factor in the stator, sufficient adherence of the insulation layer to the electric conductor is formed.

In particular, it may be advantageous if the at least one insulation layer and/or the base layer and/or the top layer and/or the support layer and/or the barrier layer is formed from a thermoplastic, preferably substantially solvent-free high-performance polymer, preferably from the group of polyaryletherketone (PAEK), polyphenylene sulfone (PPSU), polyetheretherketone (PEEK).

High-performance polymers have the advantage that they are well suited for being directly molded on a rectangular electric conductor, in particular copper or copper alloys. Furthermore, the above-mentioned high-performance polymers have high dielectric strength and insulating properties in combination with relatively high temperature resistance of more than 300° C. In addition, the aforementioned thermoplastic high-performance polymers may be extruded and/or welded and directly molded on one another. In this regard, it is possible that, when the at least one insulation layer is formed, the high-performance polymers used for the individual layers differ from one another. However, it has proven to be particularly advantageous to use similar high-performance polymers, for example for the base and top layers and/or the support layer or the barrier layer, since good chemical and mechanical molding and/or bonding to one another is thus enabled. Moreover, the complexity of the manufacturing process may thus be significantly reduced as, for example, only one basic material has to be provided.

It may further be provided that the at least one insulation layer and/or the possible base layer and/or the possible top layer and/or the support layer and/or the barrier layer comprises a thermoplastic polymer, preferably a high-performance polymer, with a crystalline content of at least 10%, preferably 20%, up to approximately 50%.

By this measure, the structural integrity of the at least one insulation layer may be ensured over a large temperature range during operation. In addition, using semi-crystalline polymers, in particular high-performance polymers, allows good formability and high mechanical stability, which may be of significant practical importance for preventing cracks and/or voids in the insulation layer when the electric conductors are deformed prior to and/or after being inserted into the laminated core.

For better understanding of the invention, the latter is explained in detail with reference to the following figures.

Figure 3:
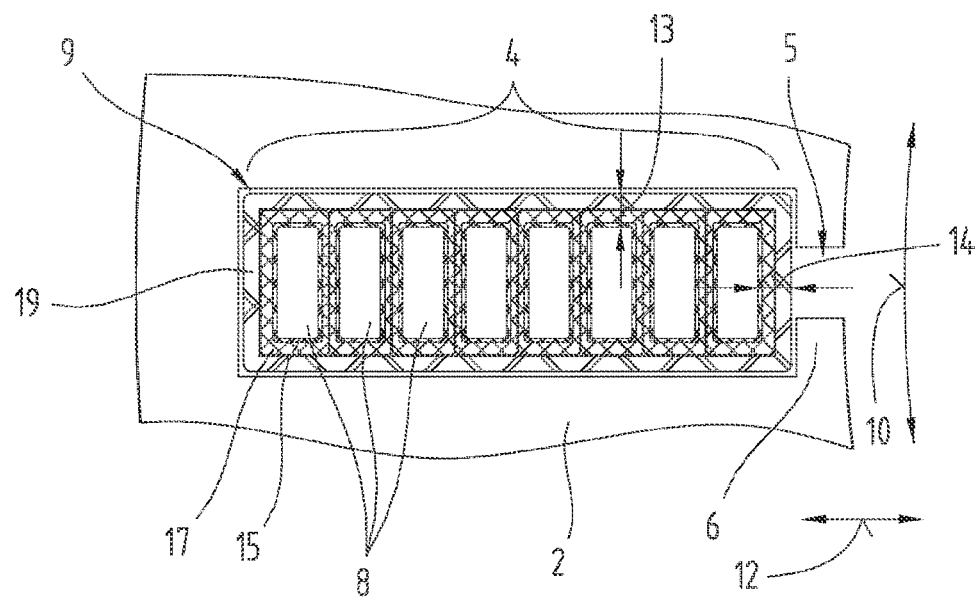

The following is shown in highly simplified, schematic representation:

FIG. 1 Oblique view of an exemplary stator with grooves that are partly filled with electric conductors;

FIG. 2 Schematic cross-sectional view of possible embodiments of electric conductors in a groove with a single (a) or double (b) insulation layer as well as parallel conductors with a double insulation layer (c);

FIG. 3 Schematic cross-sectional view through a groove with a conductor pack and electric conductors with a double insulation layer and a support layer surrounding the conductor pack;

FIG. 4 schematic cross-sectional view through a groove with a conductor pack and electric conductors with a double insulation layer and U-shaped (a) or I-shaped (b) extensions or a barrier layer (c) at the groove base and/or the stator tooth;

FIG. 5 Schematic representation of the required minimum total circumferential layer thickness depending on the maximum operating voltage of the stator.

First of all, it should be noted that in the embodiments described in different ways, identical parts are given identical reference numbers or identical component names, and the disclosures contained in the entire description may be correspondingly applied to identical parts with identical reference numbers or identical component names. Moreover, the position indications used in the description, such as at the top, at the bottom, lateral, etc. directly refer to the figure shown and described, and, if a position changes, said position indications are to be correspondingly applied to the new position.

In FIG. 1, a stator 1 is schematically shown in oblique view. In this regard, the stator 1 comprises a laminated core 2 in which a plurality of grooves 4 are distributed in the circumferential direction 10. In this regard, the grooves 4 are configured in a continuous manner in the longitudinal direction 11. In FIG. 1, multiple electric conductors 8 prior to being connected into an electric winding are shown by way of example. Analogously, FIG. 1 shows by way of example that multiple electric conductors 8 may be bent in the circumferential direction 10 for forming a coil, and electric conductors 8 corresponding to each other may be present in inter-connected form.

The grooves 4 of the laminated core 2 may be open in the radial direction 12 in the direction of the longitudinal axis 3 of the stator 1. Such openings may be configured as an air gap 5. The areas of the laminated core 2 which delimit the grooves 4 in the direction of the longitudinal axis 3 may be configured as a tooth tip 6 in the circumferential direction 10. At the opposite side of the respective groove 4, the groove base 7 is located. The exact number of grooves 4 and the electric conductors 8 received therein depend on the desired size and the design of the electric machine.

Basically, the grooves 4 may have different cross-section shapes; in this respect, corresponding, rectangular cross-sections of the grooves 4 have proven to work well for receiving electric conductors 8. For insulating the individual electric conductors 8 against each other and against the laminated core 2, the at least one insulation layer 9 has to be configured flawlessly in the circumferential direction 10 and in the radial direction 12 in a continuously closed manner in order to coat the electric conductors 8 at least within the laminated core 2. In FIGS. 2 to 4, different embodiments of insulation layers 9 are shown.

The present invention allows avoiding insulation paper and/or applying a varnish layer directly on the electric conductor 8, which allows both the production process of the individual electric conductors 8 and the assembly of the stator 1 to be performed in a relatively simple manner Especially by configuring the at least one insulation layer 9 with a total circumferential layer thickness 13 and a total radial layer thickness 14 within a preferably specified layer thickness range, the electric conductors 8 may be sufficiently protected from damage during assembly of the stator 1.

The minimum layer thickness of the total circumferential layer thickness t 13 required for sufficient insulation between the electric conductors 8 may be indicated at a ratio to a predeterminable maximum operating voltage $U_{op}$ at the stator 1:

$$t = S \cdot k \cdot C_{tol} \cdot U_{op} + d$$

The total circumferential layer thickness t 13 thus depends on a predeterminable maximum operating voltage $U_{op}$ and may be calculated with the mathematical result of the sum of a correction factor d of the quantity −175 μm and the product of a safety factor S of the quantity 2.00 with a preexponential factor k of the quantity 0.25 μm/V with a tolerance factor $C_{tol}$ in the range of 0.90 to 1.20 and the predeterminable maximum operating voltage $U_{op}$ in the range of 400 V to 1400 V.

Corresponding exemplary values for preferred total circumferential layer thicknesses 13 are indicated in Table 1 and illustrated in FIG. 5.

TABLE 1

| $t = S \cdot k \cdot C_{tol} \cdot U_{op} + d$ | | | |
|---|---|---|---|
| S = [—] | 2.00 | 2.00 | 2.00 |
| k = [μm/V] | 0.25 | 0.25 | 0.25 |
| $C_{tol}$ = [—] | 1.00 | 0.90 | 1.20 |
| d = [μm] | −175.00 | −175.00 | −175.00 |
| $U_{op}$ [V] | $t_{nom}$ [μm] | $t_{min}$ [μM] | $t_{max}$ [μm] |
| 400 | 25 | 5 | 65 |
| 450 | 50 | 27.5 | 95 |
| 500 | 75 | 50 | 125 |
| 550 | 100 | 72.5 | 155 |
| 600 | 125 | 95 | 185 |
| 650 | 150 | 117.5 | 215 |
| 700 | 175 | 140 | 245 |
| 750 | 200 | 162.5 | 275 |
| 800 | 225 | 185 | 305 |
| 850 | 250 | 207.5 | 335 |
| 900 | 275 | 230 | 365 |
| 950 | 300 | 252.5 | 395 |
| 1000 | 325 | 275 | 425 |
| 1050 | 350 | 297.5 | 455 |
| 1100 | 375 | 320 | 485 |
| 1150 | 400 | 342.5 | 515 |
| 1200 | 425 | 365 | 545 |
| 1250 | 450 | 387.5 | 575 |
| 1300 | 475 | 410 | 605 |
| 1350 | 500 | 432.5 | 635 |
| 1400 | 525 | 455 | 665 |

Usually, the tolerance factor $C_{tol}$ has the quantity 1; however, due to material-related tolerances, it may assume a tolerance factor $C_{tol}$ of 0.9 to 1.2. For the sake of simplicity, the total circumferential layer thickness 13 is referred to as t in the description, with the preferred total circumferential layer thicknesses 13 being indicated by $t_{nom}$ in Table 1. The respectively admissible minimum and maximum total circumferential layer thicknesses 13 are indicated with $t_{max}$ and $t_{min}$ for the respective operating voltage $U_{op}$.

The admissible minimum total circumferential layer thickness t 13 in the circumferential direction 10 has sufficient insulation against the laminated core 2, and the total radial layer thickness 14 in the radial direction 12 thus has sufficient insulation between the electric conductors 8.

Figure 2A:
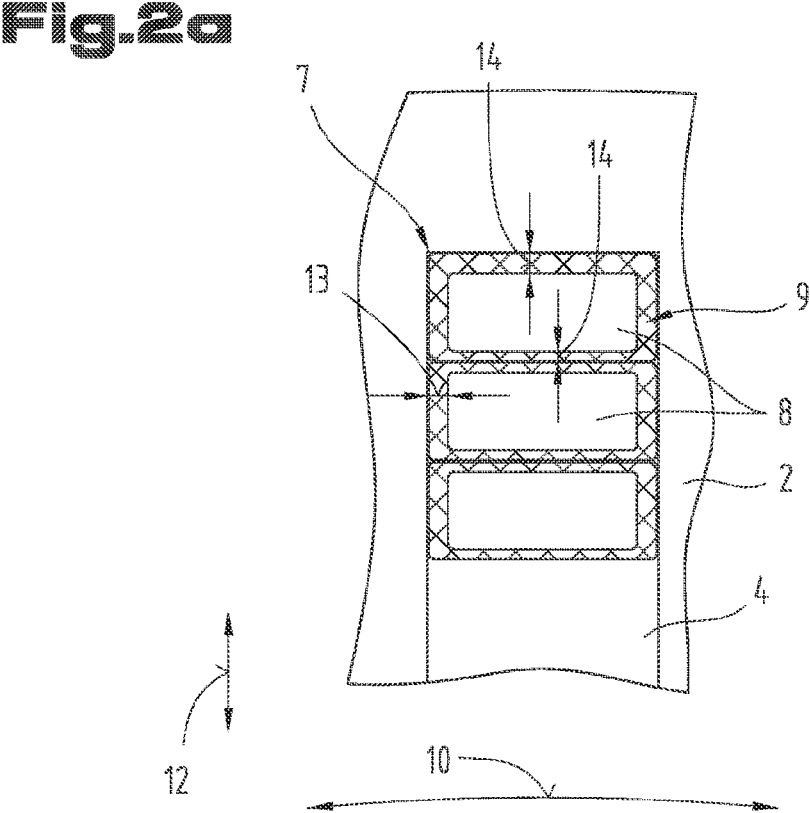

In FIG. 2a, the at least one insulation layer 9 according to the invention is schematically shown. In this regard, the insulation layer 9 has a layer thickness in the circumferential direction 10 which differs from the layer thickness in the radial direction 12. In this regard, the total circumferential layer thickness 13 is at least 1.5 to 3, preferably 1.8 to 2.2 times the total radial layer thickness 14 of the respective electric conductor 8. According to the invention, the volume fraction of the electric conductors 8 is significantly increased compared to the insulation layer 9, with the required insulating properties between the electric conductors 8 and against the laminated core 2 being preserved.

As can be seen in FIGS. 1 to 4, by directly molding the insulation layer 9 onto the electric conductor 8 according to the invention, insulation paper or any other insulation elements that are not shown may be dispensed with. Configuring the at least one insulation layer 9 with a total radial layer thickness 14 which is respectively reduced in the radial direction between the electric conductors 8 allows a very high stacking density of the electric conductors 8 in the radial direction 12.

FIG. 2a further shows an embodiment where the electric conductor 8 adjacently arranged at the outermost position directly at the groove base 7 has a higher total radial layer thickness 14 towards the groove base 7 than in the radial direction 12 away from the groove base 7 towards the nearest electric conductor 8. The limitation that the total circumferential layer thickness 13 is at least 1.5 to 3, preferably 1.8 to 2.2 times the total radial layer thickness 14 of the respective electric conductor in the radial direction 12 to the adjacently arranged electric conductor 8 is not affected by this. Analogously, such a configuration of the total radial layer thickness 14 may be formed at the innermost electric conductor 8 in the area of the tooth tip 6 or the air gap 5.

In FIG. 2b, the insulation layer 9 consists of two partial insulation layers by way of example. In this regard, a first base layer 15 is directly molded on the electric conductor 8. A top layer 17 is molded directly on the base layer 15. The two partial insulation layers thus form the at least one insulation layer 9. In the exemplary representation of FIG. 2b, the base layer 15 is configured substantially homogeneously in the circumferential direction 10 and in the radial direction 12. In this regard, the ratio of the total circumferential layer thickness 14 to the total radial layer thickness 13 is formed by different top layer thicknesses 18 in the radial direction 12 and the circumferential direction 10. Analogously to FIG. 2a, FIG. 2b also shows by way of example that the electric conductor 8 arranged adjacent to the groove base 7 has an additional increase of the total radial layer thickness 14 towards the groove base 7. In FIG. 2b, only two electric conductors 8 are shown for illustration. For the person skilled in the art, the concept can be applied in a self-explanatory manner to filling the entire groove 4.

FIG. 2c shows another possible and, if applicable, independent embodiment of the invention. In this regard, the electric conductors 8 may be configured as parallel conductors 20. In this regard, each parallel conductor 20 consists of at least two electric sub-conductors 21, which are subject to the same electric potential difference during operation. In this regard, the electric sub-conductors 21 are only coated with the base layer 15 in the circumferential direction 10 and the radial direction 12. The respectively corresponding sub-conductors 21 are jointly coated with a top layer 17. This way, current displacement effects of the electric sub-conductors 21 may be efficiently reduced. As schematically shown in FIG. 2c, the ratio of the total circumferential layer thickness 13 to the total radial layer thickness 14 is achieved by the top layer thickness 18 locally differing in the radial direction 12 and the circumferential direction 10.

In general, the limitation applies that the total circumferential layer thickness 13 of the respective electric conductors must be larger than the total radial layer thickness of the respective electric conductor 8 at the specified ratio. Any additional, locally thicker total radial layer thicknesses 14 at the groove base 7 and/or the tooth tip 6 or air gap 5 are not affected by this.

In FIG. 3, another possible embodiment is schematically shown, and although the respective electric conductors 8 in FIG. 3 have an insulation layer 9 consisting of a base layer 15 and a top layer 17, an embodiment as a single insulation layer 9 is also conceivable. As schematically shown in FIG. 3, at least two electric conductors 8 are connected in a coating manner by means of an additional support layer 19. The support layer 19 of the example in FIG. 3 may thus be considered a mechanical surround of the eight electric conductors 8 within the groove 4. If a support layer 19 is present, the layer thickness of the support layer 19 in the radial direction 12 is counted as a part of the total radial layer thickness 14. Analogously, in the example shown, the total circumferential layer thickness 13 also comprises the support layer 19 in addition to the base layer 15 and the top layer 17.

Figure 4A:
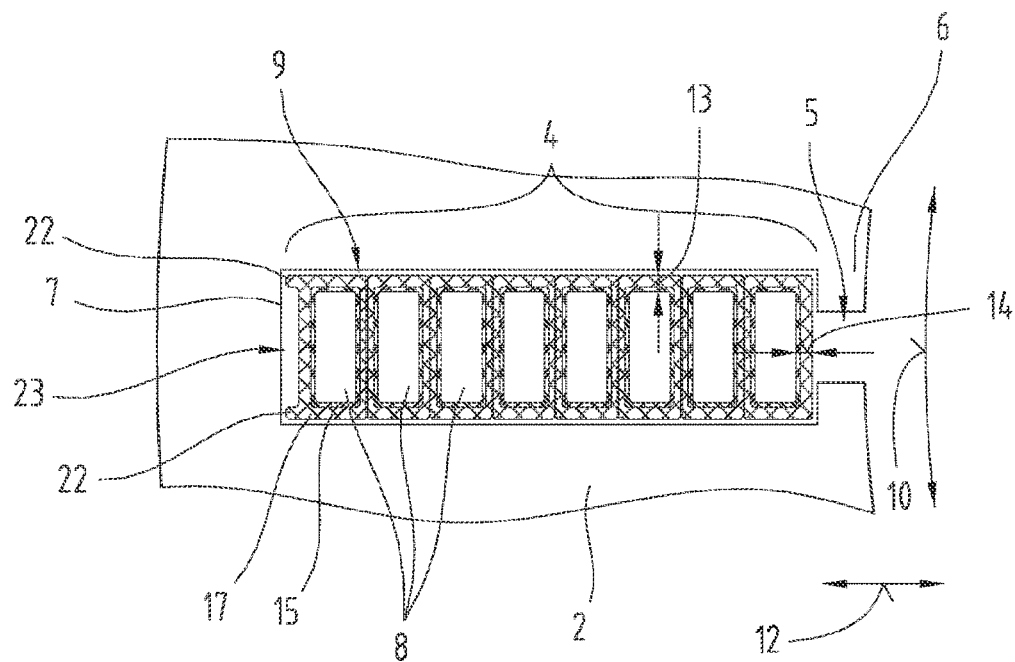
Figure 4B:
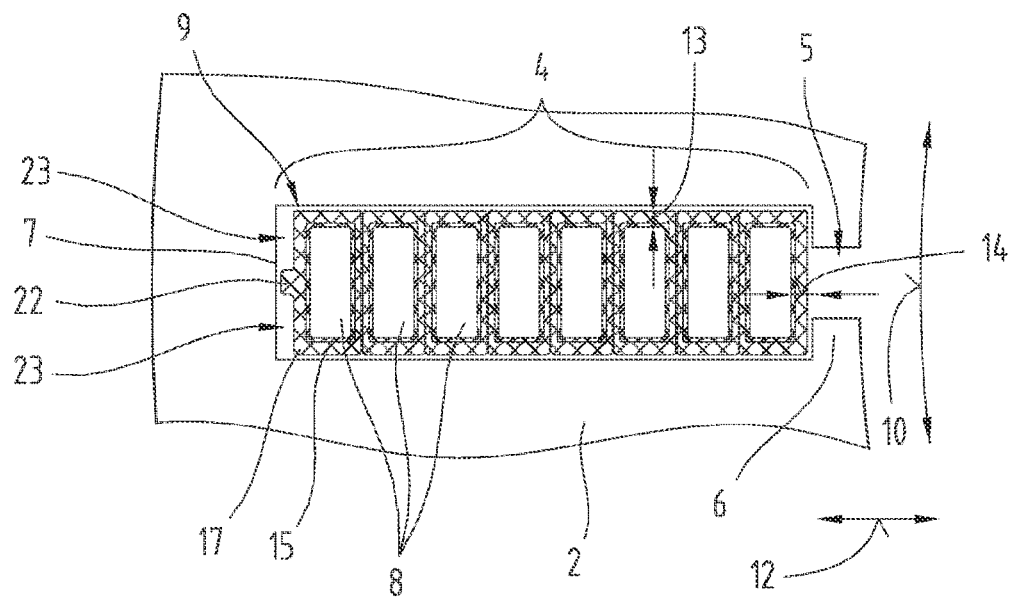
Figure 4C:
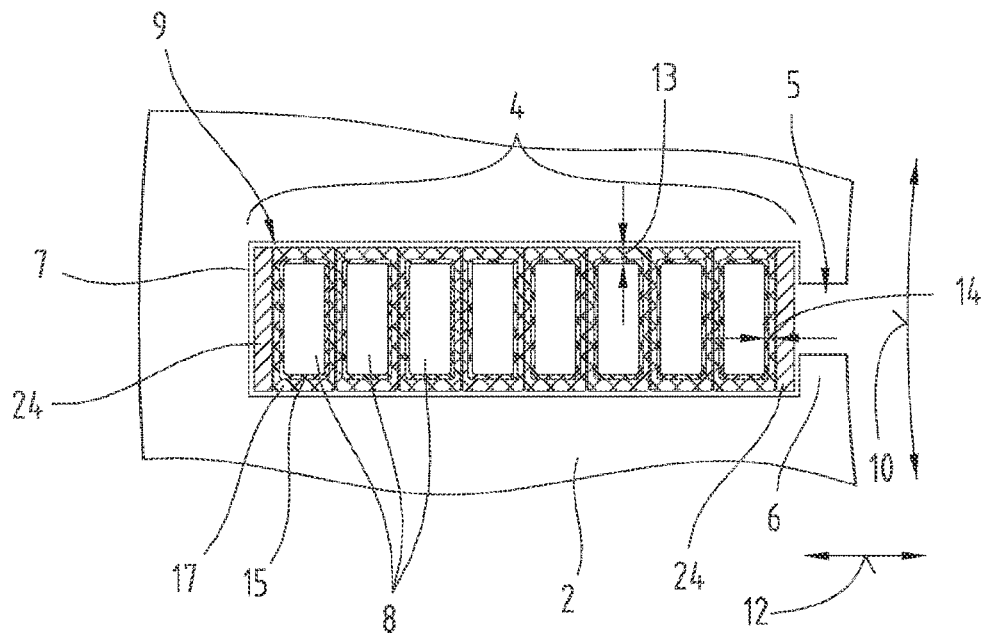

In FIG. 4, schematic embodiments are shown which for forming at least one cooling channel 23 and/or an additional electric insulation and support towards the groove base by means of a barrier layer 24 are shown [sic]. To optimize material usage, said cooling channels 23 or cavities may also be used for introducing dip or impregnating resin. The embodiments of FIGS. 4a to 4c show by way of example electric conductors 8 having an insulation layer 9 which is configured in at least two parts. However, the corresponding embodiments are also conceivable with an insulation layer 9 configured in one part.

FIGS. 4a and 4b each show embodiments where the electric conductor 8, which is arranged adjacent to the groove base 7 of the groove 4, comprises extensions 22. In FIG. 4a, two extensions 22 are formed as a part of the top layer 17 in the radial direction such that the conductor pack is braced from eight electric conductors within the groove 4. Furthermore, the two extensions 22 in FIG. 4a form a U-shaped cooling channel 23 continuously extending in the longitudinal direction 11 in the direction of the groove base 7.

FIG. 4b shows by way of example an I-shaped extension 22 as a part of the top layer 17 or insulation layer 9 of the electric conductor 8 adjacently formed at the groove base 7. In the manner shown, two cooling channels 23 are formed.

The examples shown in FIGS. 4a and 4b are compatible with the aforementioned examples in FIGS. 2a to 2c and FIG. 3; therefore, the description shall not be repeated, and reference shall be made to the description of the respective figures. In addition, it is possible to form such extensions 22 in the same way or independently in the radial direction 12 for supporting the conductor pack towards the tooth tip 6. In FIG. 4c, another, independent embodiment is shown. The insulation layers 9 of the respective electric conductors 8 are once again shown as a multi-part insulation layer 9, each comprising a base layer 15 and a top layer 17. Analogously to the description of FIGS. 2a to 4b, the formation of a single-part insulation layer 9 is conceivable. In the representation shown in FIG. 4c, all electric conductors have a substantially identical total radial layer thickness 14. To ensure the required insulating properties at the groove base 7 of the adjacently arranged electric conductor 8, an additional barrier layer 24 is provided. Such a barrier layer 24 may also be provided towards the air gap 5 and/or the tooth tip 6.

All embodiments described above refer to at least one insulation layer 9 formed from a thermoplastic, preferably substantially solvent-free high-performance polymer. Such a high-performance polymer is preferably selected from the group of PAEK, PPSU and PEEK. Analogously, both the base layer and/or the top layer and/or the support layer and/or the barrier layer may be selected from this group of polymers, in particular high-performance polymers. Particularly preferably, the aforementioned layers have a crystalline content of at least 10%, particularly preferably 20%, up to approximately 50%.

The at least one insulation layer 9 as well as the base layer 15 and/or the top layer 17 and/or the support layer 19 are directly molded on the electric conductor 8 or the underlying partial layer of the insulation layer 9. Molding of the at least one insulation layer 9 is preferably carried out by means of an extrusion process. Insulation layers 9 formed in this way preferably have an adherence to the electric conductor 8 of more than 35 g/mm.

The embodiments show possible variations; however, it should be noted at this point that the invention is not limited to its variations specifically shown; rather, various combinations of the individual variations are possible, and this variation possibility based on the technical teaching of the present invention is subject to the skills of the person skilled in the art active in this technical field.

The scope of protection is determined by the claims. However, the description and the drawings are to be used for construing the claims. The individual features or feature combinations of the different embodiments shown and described may constitute independent inventive solutions. The object underlying the independent inventive solutions may be gathered from the description.

All indications of ranges of values in the present description are to be understood such that they also include any and all sub-ranges therefrom; for example, the indication 1 to 10 is to be understood such that all sub-ranges are included, starting at the lower limit 1 up to the upper limit 10, i.e. all sub-ranges start with a lower limit of 1 or larger and end at an upper limit of 10 or less, e.g. 1 to 1.7, or 3.2 to 8.1, or 5.5 to 10.

As a matter of form, it should finally be noted that for better understanding of the structure, some of the elements have been represented unscaled and/or enlarged and/or in reduced size.

LIST OF REFERENCE NUMBERS

1 Stator
2 Laminated core
3 Longitudinal axis
4 Groove
5 Air gap
6 Tooth tip
7 Groove base
8 Electric conductor
9 Insulation layer
10 Circumferential direction
11 Longitudinal direction
12 Radial direction
13 Total circumferential layer thickness
14 Total radial layer thickness
15 Base layer
16 Base layer thickness
17 Top layer
18 Top layer thickness
19 Support layer
20 Parallel conductor
21 Sub-conductor
22 Extension 23 Cooling channel
24 Barrier layer

The invention claimed is:

1. A stator for an electric machine, comprising a laminated core having multiple grooves evenly distributed in the circumferential direction around a longitudinal axis and continuously extending in a longitudinal direction of the laminated core, which grooves are each provided for receiving at least two electric conductors having a substantially rectangular cross-section,
    said electric conductors being insulated against each other and against the laminated core by means of at least one insulation layer coating in the radial direction and the circumferential direction as well as in the longitudinal direction at least over a stator height of the stator,
    wherein the at least one insulation layer, to ensure flawless insulation, comprises a thermoplastic high-performance polymer, which is continuously closed in the circumferential direction and the radial direction and directly molded on the electric conductor by means of an extrusion process,
    wherein the insulation layer, at least in the circumferential direction, has a total circumferential layer thickness, which is 1.5 to 3 times a total radial layer thickness in the radial direction of the respective electric conductor.

2. The stator according to claim 1, wherein the at least one insulation layer has a total circumferential layer thickness t, which may be calculated depending on a predeterminable maximum operating voltage $U_{op}$ with the mathematical result of the sum of a correction factor d of the quantity $-175$ μm and the product of a safety factor S of the quantity 2.00 with a preexponential factor k of the quantity 0.25 μm/V with a tolerance factor $C_{tol}$ in the range of 0.90 to 1.20 and the predeterminable maximum operating voltage $U_{op}$ in the range of 400 V to 1400 V.

3. The stator according to claim 1, wherein at least two electric conductors are connected by means of an additional support layer coating the at least two electric conductors together in the radial direction and the circumferential direction.

4. The stator according to claim 1, wherein the total radial layer thickness of the electric conductors adjacently arranged in the radial direction at a groove base and/or at an air gap and/or the tooth tip of the respective groove, in the radial direction on the side facing the groove base or the tooth tip and/or the air gap, is 1.5 to 3 times the total radial layer thickness of an electric conductor adjacently arranged thereto in the radial direction.

5. The stator according to claim 1, wherein the insulation layer comprises a first base layer directly molded on the electric conductor and having a base layer thickness, and a second top layer directly molded on the first base layer, and having a top layer thickness.

6. The stator according to claim 5, wherein the top layer thickness, at least in the circumferential direction, is 1.5 to 3 times the underlying base layer thickness.

7. The stator according to claim 1, wherein, for forming at least one parallel conductor, at least one electric conductor comprises two sub-conductors provided for being subject to the same electric potential difference, wherein the two corresponding sub-conductors are each coated with the base layer and jointly coated with the top layer.

8. The stator according to claim 7, wherein the base layer thickness in the radial direction between the corresponding sub-conductors is 10 to approximately 100 μm.

9. The stator according to claim 8, wherein the base layer thickness in the radial direction, on the respective side facing away from the corresponding sub-conductor, in the radial direction and/or circumferential direction, has a base layer thickness of 5 to 15 times the base layer thickness between the corresponding sub-conductors.

10. The stator according to claim 1, wherein the at least one insulation layer and/or the top layer and/or the support layer comprises, in the radial direction and at least on one side, at least one extension for forming at least one cooling channel extending in the longitudinal direction of the stator.

11. The stator according to claim 1, wherein between the air gap and/or the tooth tip of the respective groove and/or at the groove base and the at least one insulation layer or the top layer or the support layer of the electric conductor and/or parallel conductor adjacently arranged in the radial direction, an additional, electrically insulating barrier layer is arranged.

12. The stator according to claim 1, wherein the at least one insulation layer has an adherence to the electric conductor of more than 35 g/mm according to VDI 2019:2016-04.

13. The stator according to claim 1, wherein the at least one insulation layer and/or the base layer and/or the top layer and/or the support layer is formed from a thermoplastic.

14. The stator according to claim 1, wherein the at least one insulation layer comprises a thermoplastic with a crystalline content of 10% to approximately 50%.

* * * * *